Inventors:
Ranajit K. Datta
Thomas W. Luscher
by
Their Attorney

United States Patent Office 3,790,490
Patented Feb. 5, 1974

3,790,490
EUROPIUM AND MANGANESE ACTIVATED STRONTIUM CHLOROSILICATE PHOSPHOR
Ranajit K Datta, East Cleveland, and Thomas W. Luscher, Wickliffe, Ohio, assignors to General Electric Company
Filed Mar. 3, 1971, Ser. No. 120,511
Int. Cl. C09k 1/54
U.S. Cl. 252—301.4 F
1 Claim

ABSTRACT OF THE DISCLOSURE

A strontium chlorosilicate phosphor, $Sr_5Si_4Cl_6O_{10}$ activated by europium and manganese is described. The phosphor produces a bright green emission when excited by 2537 and 3650 Angstrom radiation.

BACKGROUND OF THE INVENTION

The instant invention relates to color-corrected high-pressure mercury vapor lamps and phosphors therefor.

The arc in a high-pressure mercury vapor lamp (HPMV) produces lines of varying energy in the ultraviolet, blue and yellow portions of the spectrum. Major radiation occurs at 405, 436, 546 and 578 nanometer (nm.) in the visible spectrum, and also at 253, 296 and 365 in the ultraviolet. Because of the lack of radiation in the green (about 500 nm.) and especially red (about 600 nm.) portion of the color spectrum, the high-pressure mercury lamp emits a bluish light. The absence of red and green radiation causes most colored objects to appear distorted in color values. The ideal would be a lamp having a continuous spectrum and appropriate energy distribution covering the entire visible region.

Mercury vapor lamps are good emitters of ultraviolet radiation, especially with wavelength at 3650 A. The red deficiency and color rendition of HPMV lamps are much improved by coating the inside of the outer envelope with a red-emitting phosphor excited by the ultraviolet energy generated by the mercury arc. The red phosphors commonly used in HPMV lamps are tin (stannous $Sn^{2+}$) activated strontium orthophosphate (U.S. Pat. 3,110,680, Koelmans et al., June 1957), and manganese-activated magnesium fluorogermanate (U.S. Pat. 2,748,303, Thorington, May 1956). More recently, europium ($Eu^{3+}$)-activated yttrium vanadate and europium ($Eu^{3+}$)-activated yttrium vanadate phosphate Ref.: T. W. Luscher and R. K. Datta, Illuminating Engineering vol. 65, No. 1, January 1970, pp. 49–53) have found extensive use in high-pressure mercury vapor lamps. These phosphors emit in the red portion (about 600–650 nm.) of the color spectrum, thus producing a color-corrected mercury discharge lamp. However, the absence of green in the spectrum still remains and greenish objects appear distorted in color values under color-corrected HPMV lamps coated with red-emitting phosphors only.

SUMMARY OF THE INVENTION

According to the present invention $Mn^{2+}$-doped $Eu^{2+}$-activated strontium chlorosilicate ($Sr_5Si_4Cl_6O_{10}$:Eu) can be mixed with phosphor emitting in the red only and the blend when applied as a coating on the inner surface of the outer envelope of the lamp produces a higher color temperature lamp with better color rendition in the center portion of the visible spectrum.

We have confirmed that the phosphor $Eu^{2+}$-activated Sr-chlorosilicate ($Sr_5Si_4Cl_6O_{10}$:$Eu^{2+}$) responds well to both 2537 and 3650 A. radiation and has a broad emission band extending from 400 to 650 nm., peaking at 490 nm. Optimum luminescence brightness is obtained at 1:0% by wt. of europium. Going further, according to the present invention, we have discovered that when $Eu^{2+}$-activated Sr-chlorosilicate ($Sr_5Si_4Cl_6O_{10}$:$Eu^{2+}$) is doped with manganese ($Mn^{2+}$), the brightness under 2537 and 3650 A. is enhanced without any significant change in the emission spectrum.

DETAILED DESCRIPTION

In the following Table I, each sample of europium ($Eu^{2+}$)-activated strontium chlorosilicate was prepared with various amounts of manganese ranging from 0 to 3% by weight, whereas the concentration of europium was held constant at 1.0% by weight. The manganese concentration is quite significant and the data in Table I shows that the most effective range of manganese concentration is below 3% by weight: the useful range extends from 0.01 to 3.0% by weight.

Compositions and luminescent data for $Sr_5Si_4Cl_6O_{10}$: Eu, Mn

| Composition | Eu conc., percent | Mn conc., percent | Percent relative Brightness, 2537 A. | Brightness, 3650 A. |
|---|---|---|---|---|
| $Sr_5Si_4Cl_6O_{10}$ | 1 | 0 | 100 | 100 |
| $Sr_5Si_4Cl_6O_{10}$ | 1 | 0.25 | 105.5 | 109.0 |
| $Sr_5Si_4Cl_6O_{10}$ | 1 | 0.5 | 107.5 | 115.0 |
| $Sr_5Si_4Cl_6O_{10}$ | 1 | 1.0 | 108.5 | 117.0 |
| $Sr_5Si_4Cl_6O_{10}$ | 1 | 1.5 | 107.0 | 108.0 |
| $Sr_5Si_4Cl_6O_{10}$ | 1 | 2.0 | 93.0 | 100 |
| $Sr_5Si_4Cl_6O_{10}$ | 1 | 2.5 | 97.5 | 102 |
| $Sr_5Si_4Cl_6O_{10}$ | 1 | 3.0 | 93.0 | 107 |

The effect of manganese doping on strontium chlorosilicate is an enhancement of the effect of the europium activation and we have found it to hold throughout the beneficial range of europium doping extending from about 0.01 to 3.0% by weight.

Figure 1:
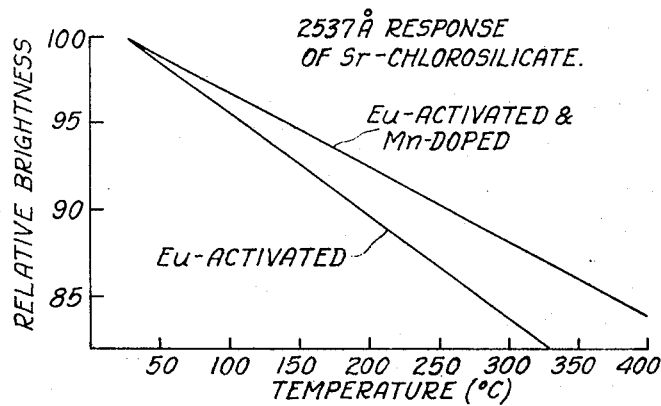
FIG. 1 is a graph of the effect of temperature on the luminescence of strontium chlorosilicate under 2537 A. excitation.
Figure 2:
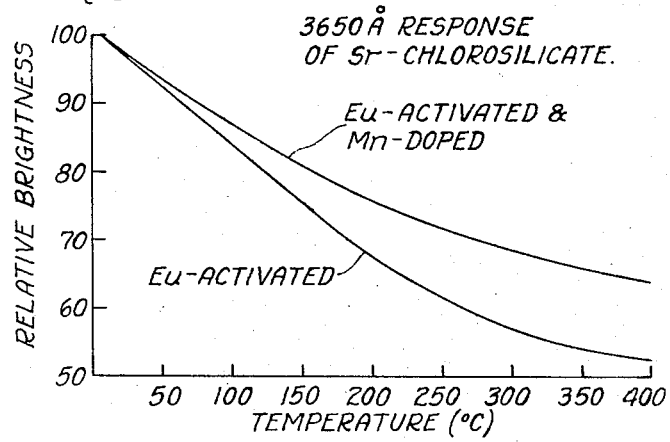
FIG. 2 is a similar graph under 3650 A. excitation.
Figure 3:
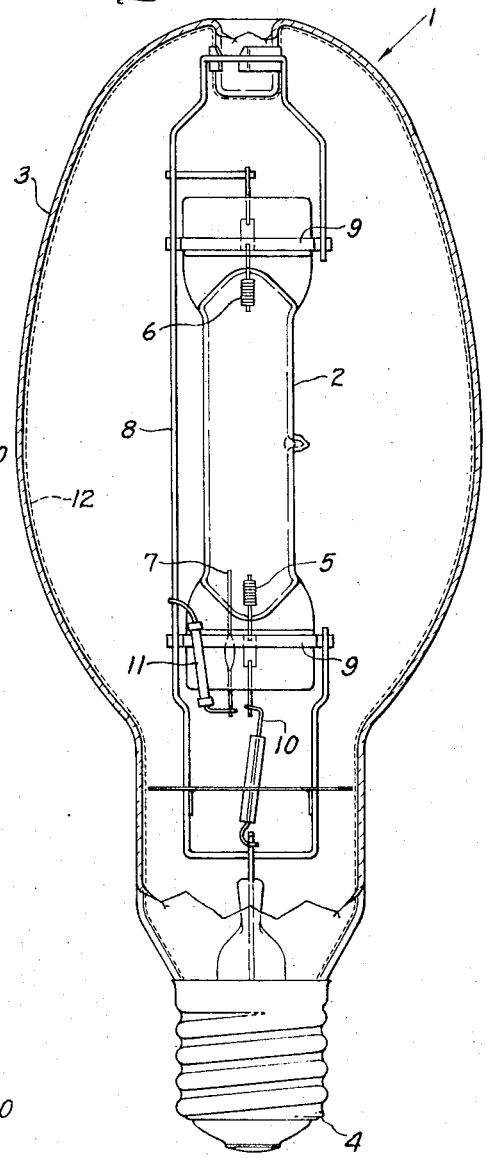
FIG. 3 shows a high pressure mercury vapor discharge lamp containing a phosphor coating in accordance with our invention.

According to another aspect of our invention, we have observed that a mercury lamp coated with a blend of europium ($Eu^{2+}$)-activated green-emitting strontium chlorosilicate (with or without manganese doping) and a characteristically red-emitting phosphor will produce an excellent color rendition with optimum brightness and commercially acceptable maintenance. To be suitable for application in high pressure mercury vapor lamps, a phosphor should be responsive to the main emission lines (especially to 3650 A. radiation) of the discharge and its luminescence, that is the nature of the spectrum and its intensity, should not be substantially adversely affected by high operating temperatures. This is because the outer envelopes of mercury lamps operate in the temperature range of 200 to 400° C. We have studied the effect of temperature on $Eu^{2+}$-activated strontium chlorosilicate and found that the phosphor has very good temperature maintenance. FIGS. 1 and 2 show the effect of temperature on the luminescence brightness of $Sr_5Si_4Cl_6O_{10}$:$Eu^{2+}$ under 2537 and 3650 A. excitations, respectively. At 300° C. the luminescent brightness under 2537 and 3650 A. excitation are about 80% and 55%, respectively of the room temperature brightness. With manganese doping, the high-temperature brightness improves even further. Thus, with about 1% manganese doping the luminescence brightnesses at 300° C. under 2537 and 3650 A. excitations are about 85% and 63%, respectively, of the room temperature brightness. Such good high-temperature brightness data, according to the present invention, makes these two phosphors ($Eu^{2+}$-activated strontium chlorosilicate with and without Mn) acceptable for application in HPMV lamps.

DESCRIPTION OF PREFERRED EMBODIMENT

Referring to the drawing, there is shown a high pressure mercury vapor lamp 1 comprising a quartz arc tube 2 enclosed within a vitreous outer jacket or envelope 3 provided with a screw base 4. The arc tube is provided with main electrodes 5, 6 at each end and an auxiliary electrode 7 located adjacent main electrode 5. The arc tube contains a measured amount of mercury which is completely vaporized during operation and an inert starting gas such as argon as is conventional in the arc.

The arc tube is supported within the outer jacket by a frame or harp comprising a single side rod 8 and metal straps 9. The frame also serves as a conductor between electrode 6 and the base shell. Another conductor 10 connects the other electrode 5 to the center contact of the base. Starting electrode 7 is connected to main electrode 6 at the opposite end of the arc tube by a current limiting resistor 11 is conventional fashion.

A coating 12 of a phosphor blend in accordance with our invention, namely divalent europium ($Eu^{2+}$)-activated strontium chlorosilicate emitting in the green and another phosphor emitting characteristically in the red is coated on the inner surface of the outer bulbous envelope or jacket 3 according to conventional techniques.

By way of examples illustrating the properties of our improved phosphor and phosphor blends, high pressure mercury vapor lamps as described above were coated with yttrium vanadate phosphate activated by europium and blends of yttrium vanadate phosphate activated by europium with approximately 20%, 25% and 40% by weight of strontium chlorosilicate ($Eu^{2+}$ activated, $Mn^{2+}$ doped). The various phosphors were prepared as suspensions of the same particle size, mixed together, and applied conventionally. The following table gives lamp data using the blends.

The maintenance figure is the percentage of lumens measured at 4000 hours of life to lumens measured at 100 hours, and it is higher with the blend. The color temperature is rising with increasing proportion of strontium chlorosilicate in the blend but it is an increase due to the presence of green and not merely an excess of blue. The color ranking is based on visual observation. Rank 1 is lacking in the middle range of the visible spectrum. Rank 2 has improved response. Rank 3 has the best color rendition with both reds and greens appearing natural. Rank 1a is weighted too much towards green and is lacking in red and while its color temperature is higher, it represents a departure from the black body locus. In blends useful for high pressure mercury vapor lamps, the percentage by weight of strontium chlorosilicate extends from 5% to 50% by weight where the other component of the blend is a characteristically red-emitting phosphor of similar particle size, but the specific percentage will be governed by choice of red-emitting phosphor and intended application of the lamp. The preferred percentage of strontium chlorosilicate in a blend with $YV,PO_4$ for general lighting lamps is from 20 to 30%. Depending upon the nature of the characteristically red-emitting phosphor selected for the blend, the proportion of strontium chlorosilicate in the blend and other factors such as the thickness of the coating, the use of a blend according to our invention permits the design of high pressure mercury vapor lamps having color temperatures ranging from about 3200° K. to 4500° K.

What we claim as new and desire to secure by Letters Patent of the United States is:

1. A green emitting $Sr_5Si_4Cl_6O_{10}$ phosphor coactivated with divalent europium ion in a concentration from 0.01 to 3.0% by weight and divalent manganese ion in a concentration from 0.01 to 3.0% by weight so as to improve phosphor brightness without significantly changing the emission spectrum under ultraviolet excitation.

TABLE II

| Phosphor | LPW | Percent red | Maintenance, percent L | Color temp., ° K | Color rank |
|---|---|---|---|---|---|
| $YV, PO_4$ | 53.0 | 9.8 | 89.5 | 3,880 | 1 |
| $YV, PO_4 + 20\% Sr_5Si_4Cl_6O_{10}$ | 54.4 | 7.6 | 96.8 | 3,960 | 2 |
| $YV, PO_4 + 25\% Sr_5Si_4Cl_6O_{10}$ | 53.3 | 7.5 | 96.9 | 4,220 | 3 |
| $YV, PO_4 + 40\% Sr_5Si_4Cl_6O_{10}$ | 53.9 | 5.9 | 95.5 | 4,500 | 1a |

References Cited

UNITED STATES PATENTS 3,513,103  5/1970  Shaffer _____ 252—31.0 P
3,516,940  6/1970  Lagos _____ 252—301.4 P

FOREIGN PATENTS 1,087,655  10/1967  Great Britain ____ 252—301.4 F

OSCAR R. VERTIZ, Primary Examiner

J. COOPER, Assistant Examiner

U.S. Cl. X.R.

252—301.4 P; 313—109